United States Patent
Tiberghien et al.

(10) Patent No.: US 8,899,550 B2
(45) Date of Patent: Dec. 2, 2014

(54) CONNECTOR DESIGNED TO REMOVABLY CONNECT TWO FLUID CHANNELS

(71) Applicant: Staubli Faverges, Faverges (FR)

(72) Inventors: Alain-Christophe Tiberghien, Sevrier (FR); Christophe Durieux, Gilly sur Isere (FR); Serafim Marques Barroca, Frontenex (FR)

(73) Assignee: Staubli Faverges, Faverges (FR)

( * ) Notice: Subject to any disclaimer, the term of this patent is extended or adjusted under 35 U.S.C. 154(b) by 89 days.

(21) Appl. No.: 13/720,639

(22) Filed: Dec. 19, 2012

(65) Prior Publication Data

US 2013/0160880 A1    Jun. 27, 2013

(30) Foreign Application Priority Data

Dec. 23, 2011    (FR) ...................... 11 62416

(51) Int. Cl.
| | |
|---|---|
| *F16L 37/28* | (2006.01) |
| *F16L 29/00* | (2006.01) |
| *F16L 37/32* | (2006.01) |
| *F16L 33/18* | (2006.01) |
| *F16L 37/34* | (2006.01) |
| *F16L 31/00* | (2006.01) |
| *F16L 37/252* | (2006.01) |
| *F16L 55/10* | (2006.01) |

(52) U.S. Cl.
CPC ................. *F16L 31/00* (2013.01); *F16L 37/34* (2013.01); *F16L 2201/20* (2013.01); *F16L 37/252* (2013.01); *F16L 55/1015* (2013.01)
USPC .................. 251/149.6; 251/148; 137/614.04; 285/361

(58) Field of Classification Search
CPC ......... F16L 37/252; F16L 37/34; F16L 37/38; F16L 37/30; F16L 37/36; F16L 37/413; F16L 37/248
USPC ........................ 251/149.1, 149.5, 149.6, 148; 137/614.03–614.05, 614; 285/360–361, 376, 396, 401–402
See application file for complete search history.

(56) References Cited

U.S. PATENT DOCUMENTS

| | | | | |
|---|---|---|---|---|
| 3,100,655 | A | * | 8/1963 | Work ............................ 285/33 |
| 3,470,524 | A | * | 9/1969 | Culver ......................... 439/317 |
| 5,009,252 | A | * | 4/1991 | Faughn .................... 137/614.04 |

(Continued)

FOREIGN PATENT DOCUMENTS

EP    1862719 A1    12/2007

*Primary Examiner* — John K Fristoe, Jr.
*Assistant Examiner* — Michael R Reid
(74) *Attorney, Agent, or Firm* — Dowell & Dowell, PC (57) ABSTRACT

A connector for removably connecting two fluid channels which includes a first element and a second element that fit into one another and wherein the first element includes a body connected with the second element when the second element and the first element are at least partially fitted into one another following a combined relative rotational and translational movement, by a first link between at least one locking pin and at least one locking slot, and wherein the first element includes a single ring mounted around the body and wherein the body and the ring are linked following a combined relative rotational and translational movement by a second link between at least one guiding pin and at least one guiding slot.

18 Claims, 7 Drawing Sheets

(56) References Cited

U.S. PATENT DOCUMENTS

| | | | |
|---|---|---|---|
| 5,056,560 A | | 10/1991 | Demartelaere |
| 5,149,149 A | * | 9/1992 | Wu .............................. 285/402 |
| 5,256,077 A | * | 10/1993 | Mattingly et al. ............ 439/314 |
| 6,196,522 B1 | * | 3/2001 | Yuen et al. ................. 251/149.5 |
| 7,469,718 B2 | * | 12/2008 | Lambert et al. .......... 137/614.04 |
| 2007/0274772 A1 | | 11/2007 | Tiberghien |

* cited by examiner

CONNECTOR DESIGNED TO REMOVABLY CONNECT TWO FLUID CHANNELS

BACKGROUND OF THE INVENTION

1. Field of the Invention

The present invention relates to a connector designed to removably connect two fluid channels.

2. Brief Discussion of the Related Art

A connector traditionally includes a first element and a second element complementary to each other, that are connected by fitting them into one another. The first and second elements are each connected to a channel. The first and/or the second element is generally provided with a sealing valve that is maneuvered toward an open position when the two elements are fitted together. After this fitting together, the two channels are connected and the fluid can flow from one to the other.

For certain applications, the connector has tearing risks. For example, if one of the elements of the connector is connected to a vehicle and the other is connected to a stationary tank, the vehicle may move away from the tank during filling while the two elements of the connector are fitted together. In that case, the elements of the filling chain, and in particular the elements of the connector, risk being altered and the pumped product risks spilling into the surrounding area.

EP-A-1 862 719 discloses a connector that comprises a female element made up of a body, a locking ring rotatably mounted around the female body, and a safety ring mounted around the locking ring. The locking ring is provided with two L-shaped locking slots with an axial portion and a circumferential portion that cooperate with pins of the male element of the connector so as to produce a bayonet-type fastening. Two safety slots are formed in the safety ring. The pins of the male element are long enough to pass through the slots of the locking ring and cooperate with the slots of the safety ring. The safety slots include an inlet portion, which is inclined relative to the longitudinal axis of the female element, and an end portion parallel to that axis that circumferentially locks the pins in the locking ring in the connected configuration of the connector. In the event of accidental tearing apart, the safety ring is moved opposite the male element and comes into direct contact with the pins of the male element, automatically causing the safety ring and the locking ring to rotate in a direction that makes it possible to release the bayonet connection between the male element and the locking ring. In this way, the connector disconnects automatically and does not risk being damaged. Once disconnected, valves of the male and female elements prevent the fluid from spreading.

However, this connector risks not working correctly under all conditions, in particular when the connector is used to transfer liquid nitrogen, i.e. at very low temperatures. In fact, ice tends to form in the connector, between the male element and the locking ring as well as between the two rings. Consequently, in the event of tearing, the forces generated are insufficient to break that ice. The connector thus does not disconnect automatically and risks being damaged. Furthermore, this connector is relatively complex and expensive to manufacture, as the female element includes two rings.

BRIEF SUMMARY OF THE INVENTION

The invention more particularly aims to resolve these drawbacks by proposing a connector that can disconnect automatically in the event of tearing, in particular when ice has formed in the connector and is locking the relative movement of the elements of the connector.

To that end, the invention relates to a connector for removably connecting two fluid channels, the connector extending longitudinally along an axis and comprising a first element and a second element that can fit into one another, the first element comprising a body delimiting a fluid passage channel that extends axially, at least one of the first element and the second element being equipped with a valve and a resilient member for returning the valve to the sealing position, each valve ensuring fluid sealing of the element when the connector is in the disconnected configuration and allowing the fluid to flow in the channel when the connector is in the connected configuration. The second element and the body are connected, when the second element and the first element are at least partially fitted in one another, following a combined rotational and translational relative movement, by a first connection between at least one locking pin and at least one locking slot that comprises an inlet portion and a locking portion. In the connected configuration of the connector, the body adopts an axial locking position relative to the second element. The first connection is on the one hand done such that the body moves past its axial locking position relative to the second element to engage the locking pin in the locking portion of the locking slot during the connection and, on the other hand, able to lock the second element axially relative to the body of the first element when the connector is in the connected configuration and the locking pin cooperates with the locking portion, the resilient return member of each valve then opposing the axial approach between the second element and the body. The first element comprises a ring mounted around the body, the body and the ring being connected in a combined relative rotational and translational movement along the axis by a second connection between at least one guiding pin and at least one guiding slot. When the second element and the first element are at least partially fitted into one another, the second element and the ring are translatable and rotationally connected relative to one another along the axis. When the locking pin cooperates with the locking portion of the locking slot in the connected configuration of the connector, the guiding pin is arranged in the guiding slot. When the connector is in the connected configuration and the ring is moved relative to the body along the axis, opposite the second element, the connector adopts an intermediate connected configuration, in which the locking pin is positioned outside the locking portion of the locking slot.

Owing to the invention, the movement of the ring makes it possible to unlock the two connecting elements automatically in the event of accidental tearing, in particular when ice is inserted between those two elements, since the number of components of the connector is limited and the actuating is done at a distance from the contacts subject to the ice. Through action of the ring in a direction opposite the second element, the body of the first element is driven toward the second element, against the resilient forces of the valves, with the locking pin, which progresses outside the locking portion of the locking slot. Furthermore, the connector according to the invention has a simple design, the second element only comprising one ring. In this way, the connector is relatively simple and inexpensive to manufacture.

According to advantageous but optional features of the invention, such a connector may incorporate one or more of the following technical features, considered in all technically allowable combinations:

A first angle between a geometric axis of a first portion of the guiding slot, in which the guiding pin is positioned in the connected position of the connector, on the one hand, and a first plane that passes through the axis, which extends in a radial direction relative to the axis and which intersects the first portion of the guiding slot, on the other hand, is smaller by at least 15°, preferably 45°, than a second angle between a geometric axis of the locking portion of the locking slot on the one hand, and a second plane that passes through the axis, extends in a radial direction relative to the axis, and intersects the locking portion of the locking slot, on the other hand.

The first angle is comprised between 20° and 40°.

When the connector is in the disconnected configuration and the first element is in a retracted configuration, in which the ring is axially retracted relative to the body, opposite the distal end of the body, the guiding pin is positioned in the guiding slot.

Each guiding slot also comprises a second portion inclined relative to the axis with which the guiding pin cooperates in the detached configuration of the connector. A third angle between a geometric axis of the second portion of the guiding slot on the one hand, and the first plane on the other hand, is comprised between the value of the first angle and 80°, preferably equal to 60°.

When the guiding pin cooperates with the first portion of the guiding slot, the body reaches or exceeds its axial locking position relative to the second element.

The locking pin is formed on an inner radial surface of a distal part of the body of the first element.

The guiding pin is formed on an inner radial surface of a proximal part of the ring.

The body bears both the guiding pins and the locking pins.

The body includes a stop that limits the axial movement of the ring opposite a distal end of the body.

A resilient return member is axially inserted between the body of the first element and the ring. The resilient element can push the ring back against the stop.

The body includes a stop that limits the axial movement of the ring toward a distal end of the body.

The ring is provided with posts. The second element is provided with notches. When the first element and the second element are at least partially fitted into one another, the notches cooperate with the posts, which blocks the rotation around the axis of the second element relative to the ring.

The ring is provided with holes that put an outer surface of the body in communication with the outside of the connector.

The body of the first element is made up of an inner body defining a channel for the fluid and a main body that are coaxial and integral. The second element is made up of an inner body defining a passage for the fluid and a main body that are coaxial and integral. The connection between the locking pin and the locking slot is made at the main bodies, the inner bodies and the main bodies of the first and second elements being separated by an annular space.

BRIEF DESCRIPTION OF THE SEVERAL VIEWS OF THE DRAWINGS

At least one cable connects the ring to the channel of the first element. At least part of the channel of the first element is not parallel to the axis. The cable is fastened on the channel on the side opposite the first element relative to the part of the channel not parallel to the axis X-X'.

The invention will be well understood, and other features thereof will appear more clearly, in light of the following description of three connectors according to the invention, provided solely as an example and done in reference to the appended drawings, in which.

DETAILED DESCRIPTION OF THE INVENTION

FIGS. 1 to 8 show a connector comprising a coupling element 3 making up a first element of the connector and configured as a female element, as well as an end piece 2 making up a second element of the connector 1 and configured as a male element. The coupling element 3 comprises a body 4 and an unique ring 5 mounted around the body 4 with the possibility of relative movement. When the end piece 2 and the coupling element 3 are fitted into one another, they extend along a longitudinal axis X-X'. The axis X-X' also makes up an axis of revolution for the end piece 2, the body 4 and the ring 5. The end piece 2 is connected to a fluid channel C2, shown in mixed lines in FIGS. 2 to 6, and the coupling element 3 is connected to a fluid channel C3, also shown in mixed lines in FIGS. 2 to 6.

A surface here is described as "radial" or "axial" according to the orientation of a normal to that surface. Furthermore, a radial surface is described as "inner" if it is turned toward the axis X-X', and "outer" if it is turned in the opposite direction. The adjective "proximal" designates an element of a piece close to the channel C2 or C3 to which that piece is connected, while the adjective "distal" designates an element that is further therefrom.

Figure 1:
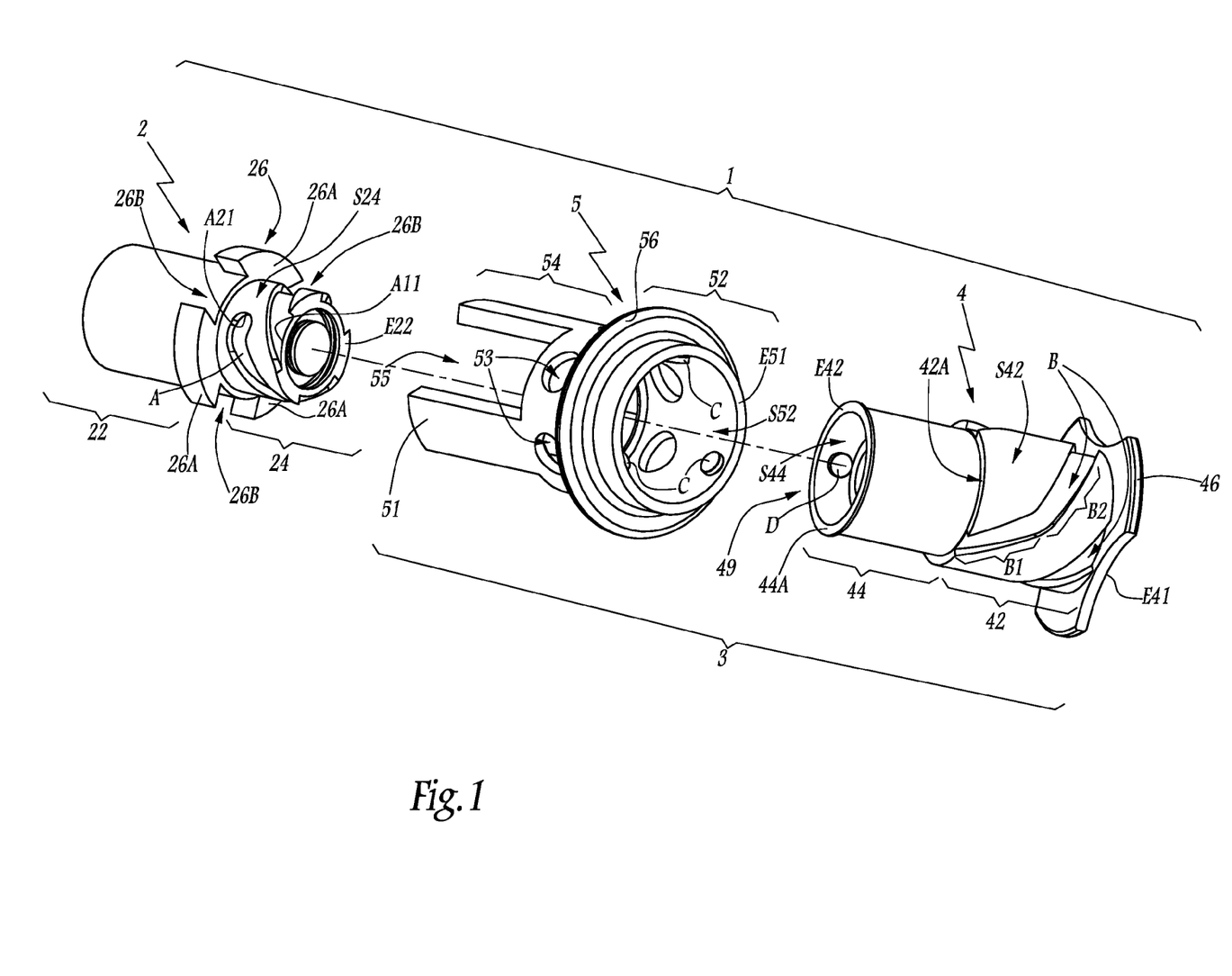
FIG. 1 is a perspective view that separately shows a body and a ring that are part of a first element of a connector according to the invention on the one hand, and a second element of the same connector on the other hand.

The end piece 2 includes a main body made up of a proximal portion 22 connected to the channel C2 and a distal portion 24. An outer radial flange 26 extends along the axis X-X' between the portions 22 and 24. The flange 26 is notched, and it includes three wings 26A separated from each other by notches 26B. Each notch 26B has two parallel edges extending along the axis X-X' and delimiting the sides of the notch 26B. The end piece 2 defines a longitudinal passage 20 through which a fluid can flow, for example liquid nitrogen.

The body 4 comprises a proximal portion 42 and a distal portion 44, as well as an actuating flange 46 that constitutes a proximal end E41 of the body 4. The body 4 delimits a channel 30 for the through flow of the fluid and includes a distal opening or mouth 49, with a shape complementary to the distal portion 24 of the end piece 2, so as to receive the end piece 2. The passage 20, the opening 49 and the channel 30 extend longitudinally along the axis X-X'. The body 4 is mounted freely rotating around the axis X-X' relative to the channel C3.

Figure 3:
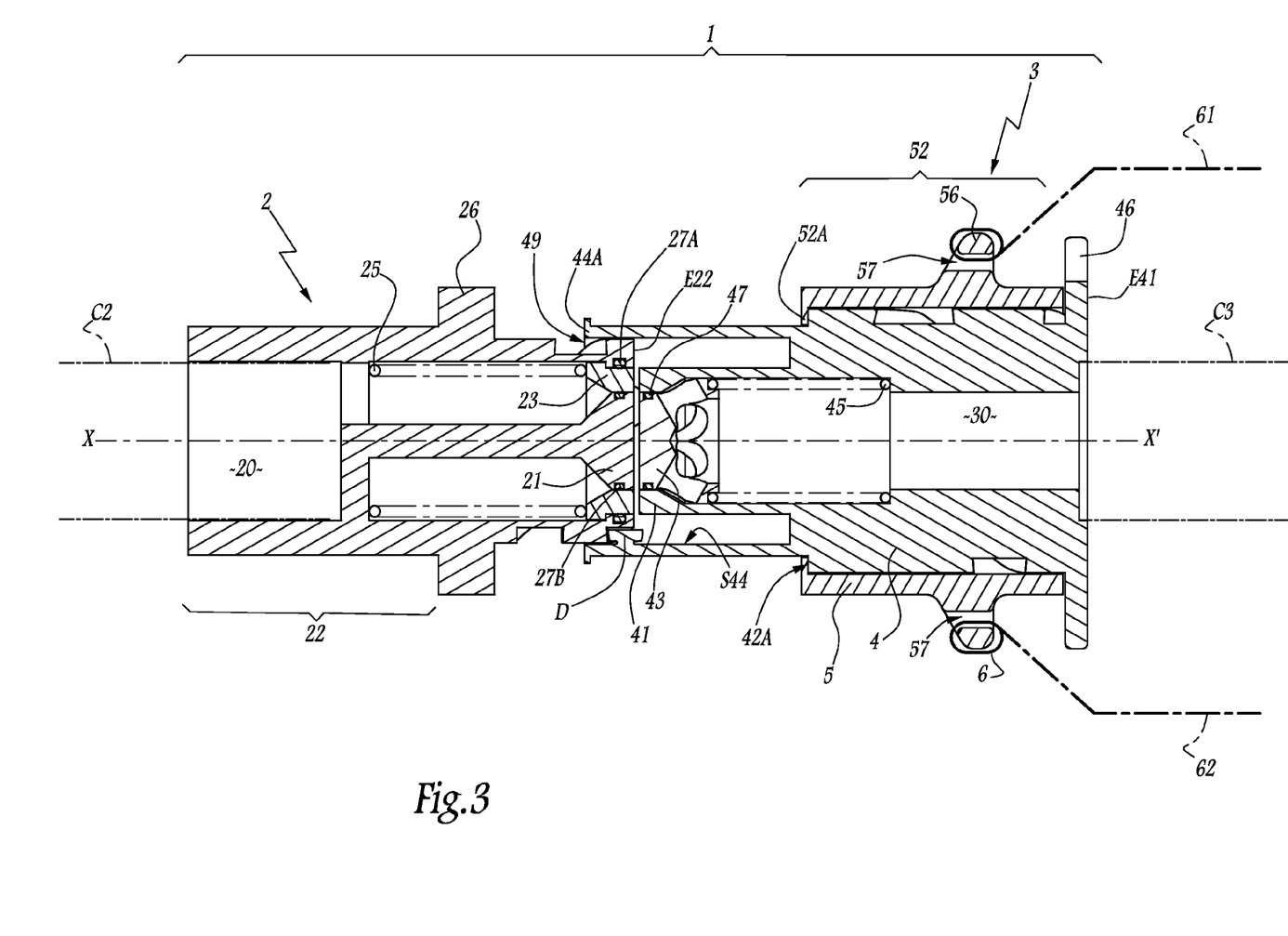
FIG. 3 is an axial cross-section of the connector of FIG. 2.

The distal portion 24 of the end piece 2 houses a valve 23 that closes off the passage 20 when the connector 1 is in the disconnected configuration. The valve 23 is pushed back by default against its seat 21 in the sealing position using a spring 25. A first O-ring 27A is mounted in an outer radial groove of the seat 21 of the valve 23 and another O-ring 27B is mounted in an inner radial groove formed at a distal end E22 of the end piece 2, turned toward the coupling element 3 during connection.

In the same way, the body 4 houses a valve 43 designed to close off the channel 30 when the connector 1 is disconnected. The valve 43 is pushed back by default against its seat 41 in the sealing position using at least one spring 45. An O-ring 47 is mounted in an outer radial groove of the valve 43.

The O-rings 27A, 27B and 47 ensure fluid sealing of the end piece 2 and the coupling element 3 when the connector 1 is in the disconnected configuration.

Figure 5:
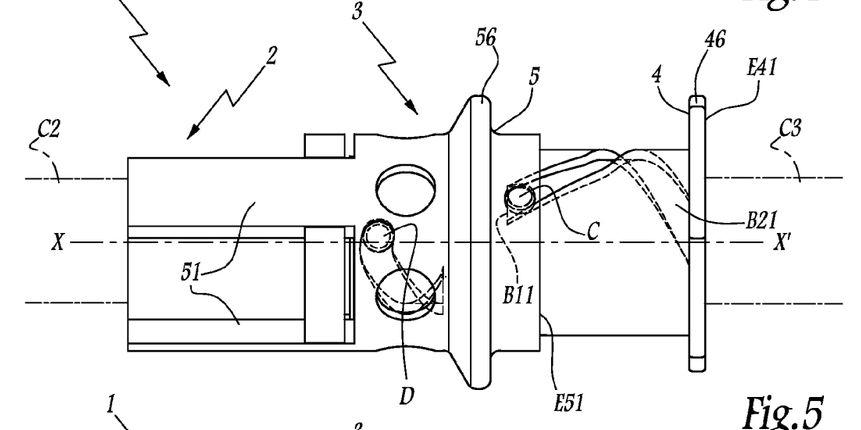
Figure 6:
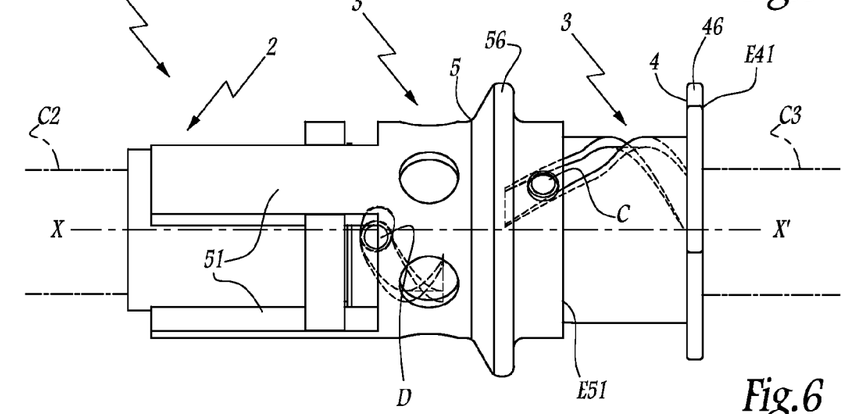

In the connected configuration of the connector 1, illustrated in FIG. 5, the distal end E22 of the end piece 2 pushes the valve 43 back outside its seat 41, against a resilient closing force exerted by the spring 45. In the same way, a distal end of the body 4, on which the seat 41 is formed, pushes the valve 23 back outside its seat 21, against a resilient closing force exerted by the spring 25. The fluid can then flow from the upstream channel C3 toward the downstream channel C2, through the channel 30 and the passage 20. The terms upstream and downstream refer to the direction of the flow of the fluid from the channel C3 toward the channel C2. The other flow direction can also be considered, the relative terms upstream and downstream then being reversed.

The end piece 2 includes three identical locking slots A that are formed on an outer radial surface S24 of the distal portion 24 and that have a uniform angular distribution over the circumference of that surface. Each locking slot A includes an inlet portion A1 and a locking portion A2. The inlet portion A1 of each locking slot A has an inlet A11 and opens on the distal end E22 of the end piece 2. The end of the locking portion A2 of each locking slot A, opposite the inlet A11, forms a closed end A21 of the locking slot A.

An axial outer shoulder 42A is formed between the portions 42 and 44 of the body 4, the outer diameter of the distal portion 44 being smaller than the outer diameter of the proximal portion 42.

The proximal portion 42 of the female body includes three identical outer guiding slots B that have a uniform angular distribution over the circumference of an outer radial surface S42 of the proximal portion 42. Each guiding slot B comprises a distal portion B1 and a proximal portion B2 adjacent to the actuating flange 46. The distal end B11 of the distal portion B1 of each guiding slot B opens on the shoulder 42A. The proximal end B21 of the proximal portion B2 of each guiding slot B is closed by the flange 46.

A distal end E42 of the body 4, which is turned toward the end piece 2 during connection, is provided with three inner cylindrical locking pins D that extend radially and are distributed with a regular angular spacing over the circumference of an inner radial surface S44 of the distal portion 44. During fitting of the end piece 2 into the coupling element 3, the locking pins D cooperate with the locking slots A of the end piece 2.

The ring 5 is mounted around the body 4 and comprises a proximal portion 52 and a distal portion 54. The proximal portion 52 is radially extended outward by an actuating flange 56, the outer diameter of which is larger than that of the portions 52 and 54. Circular openings 53 are pierced radially in the proximal portion 52 of the ring 5 and put the outer radial surface S42 of the body 4 in communication with the atmosphere outside the connector 1.

Figure 9:
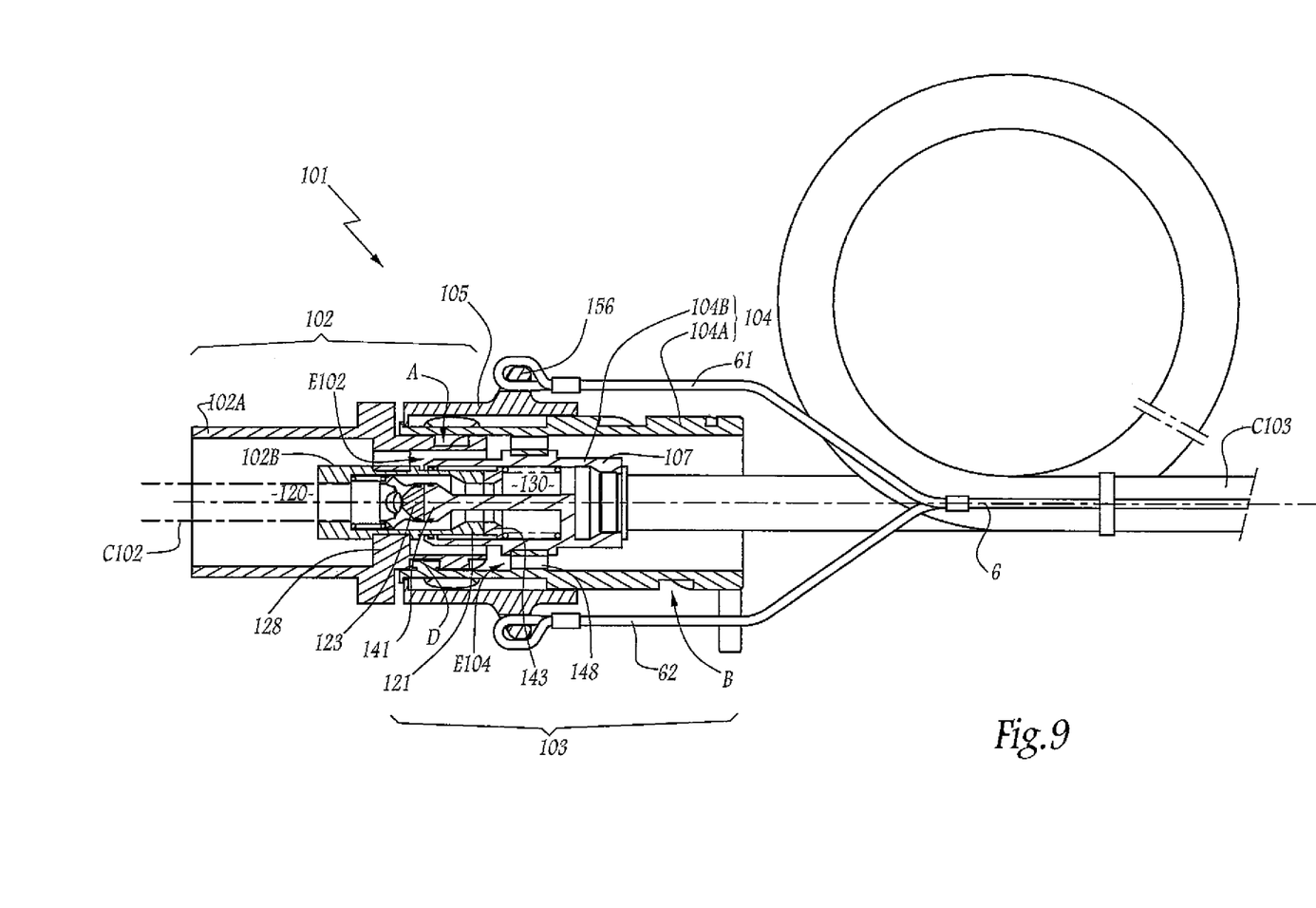
FIG. 9 is an axial cross-section of a connector according to a second embodiment of the invention, in the connected configuration.

The cable 6, shown only on the connector 101 of FIG. 9, but being installed similarly on the connector 1, connects the actuating flange 56 of the ring 5 to the channel C3. The cable 6 is divided into two cable portions 61 and 62, each attached to a hole 57 that passes axially through the flange 56. The holes 57 are diametrically opposite to distribute the pulling forces transmitted by the cable 6. In FIG. 3, the portions 61 and 62 of the cable 6 are shown by their outline, in mixed lines.

The distal portion 54 includes three posts 51 that extend axially and that are separated from each other by notches 55. Each tenon 51 has two parallel longitudinal edges. Near one proximal end E51 one of the ring 5, the inner radial surface S52 of the proximal portion 52 is provided with three cylindrical guiding pins C that extend radially and are distributed angularly uniformly over the circumference of the inner radial surface S52.

The distal end of the proximal portion 52 of the ring 5 is extended radially inward by an annular flange 52A, shown in FIG. 3, provided to abut axially against the shoulder 42A of the body 4 when the ring 5 is maximally retracted toward the channel C3, relative to the body 4.

The distal end E42 of the body 4 is extended radially outward by an annular flange 44A.

In the assembled configuration of the coupling element 3, i.e. when the ring 5 is mounted around the body 4, the guiding pins C of the ring 5 are housed in the guiding slots B of the body 4 and the annular flange 52A of the ring 5 is axially retained between the annular flange 44A and the shoulder 42A of the body 4. The ring 5 and the body 4 are thus integral, i.e. they can no longer separate, and they are connected in a combined relative rotational movement, around the axis X-X', and translational movement, along the axis X-X', i.e. the ring 5 moves axially along the axis X-X' relative to the body 4 at the same time as it rotates around the axis X-X' relative to the body 4. This movement is defined by the geometry of the guiding slots B with which the guiding pins C are connected.

In FIGS. 2, 4, 5 and 6 and in the description that follows, for greater clarity and simplification purposes, only one locking slot A, one guiding slot B, one guiding pin C and one locking pin D are shown and described, knowing that each of the three slots A and B and each of the pins C and D are similar to those shown and described. The hidden edges of these elements A, B, C and D are shown in dotted lines to show their geometry.

Figure 7:
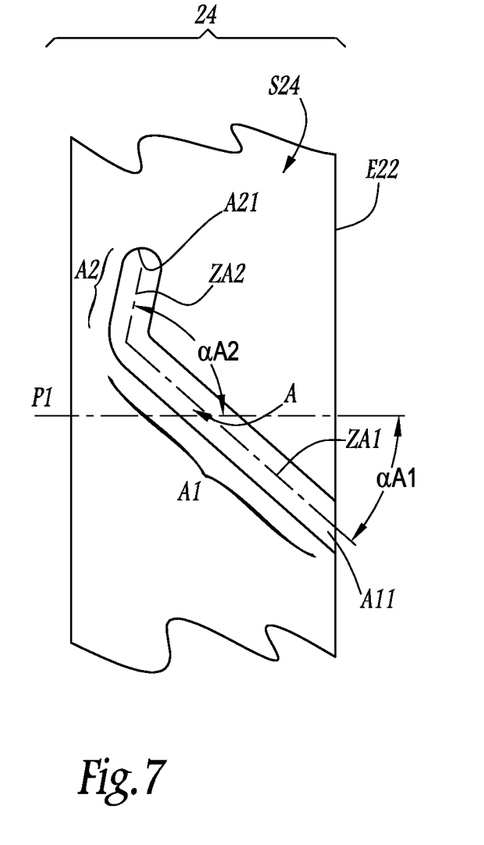
FIG. 7 is a developed view of detail VII in FIG. 2, showing only the second element of the connector.

In the view developed in FIG. 7, ZA1 denotes the central geometric axis of the inlet portion A1 of the locking slot A. The axis ZA1 is rectilinear. αA1 denotes the angle protruding between the axis ZA1 and a plane P1 that extends in a radial direction relative to the axis X-X' and intersects the inlet portion A1 of the locking slot A at its two edges. In the view of FIG. 7, the plane P1 is perpendicular to the developed outer radial surface S24 of the distal portion 24 of the end piece 2. The portion A1 of the locking slot A is rectilinear; in other words, the angle αA1 is constant along the portion A1. The angle αA1 is equal to 60°. It may be comprised between 40° and 80°.

The angle αA1 is defined on the one hand between the part of the axis ZA1 arranged on the side of the inlet A11 relative to the plane P1, and on the other hand the plane portion P1 arranged on the side of the distal end E22 relative to the axis ZA1.

In the view developed in FIG. 7, ZA2 denotes the central geometric axis of the locking portion A2 of the locking slot A. The axis ZA2 is rectilinear. αA2 denotes the angle protruding between the axis ZA2 and the plane P1. The portion A2 of the locking slot A is rectilinear; in other words, the angle αA2 is constant along the portion A2.

The angle αA2 is defined between the part of the axis ZA2 arranged on the side of the inlet A11 relative to the plane P1 on the one hand, and the part of the plane P1 arranged on the side of the distal end E22 relative to the axis ZA2 on the other hand. The angle αA2 is equal to 75°. Its value may be comprised between 35° and 85°. The axis ZA2 has a circumferential component perpendicular to the plane P1 and an axial component parallel to the axis X-X'. In the direction of the progression of the locking pin D in the locking slot A, i.e. in a direction going from the inlet A11 toward the closed end A21 of the locking slot A, the locking portion A2 extends toward the distal end E22 of the end piece 2, opposite the channel C2, because the angle αA2 is strictly smaller than 90°.

Figure 8:
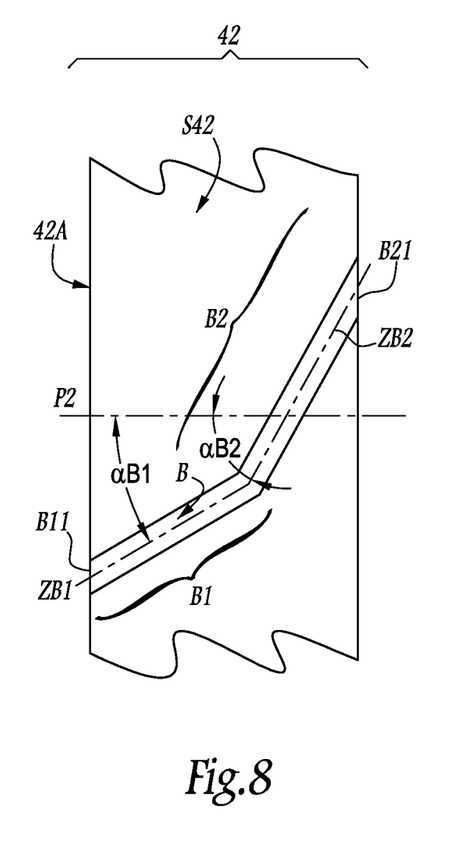
FIG. 8 is a developed view of detail VIII in FIG. 2, showing only the first connecting element.

In the view developed in FIG. 8, ZB1 denotes the central geometric axis of the distal portion B1 of the guiding slot B. αB1 denotes the angle protruding between the axis ZB1 and a plane P2 that extends in a radial direction relative to the axis X-X' and intersects the distal portion B1 of the guiding slot B at its two edges. The distal portion B1 of the guiding slot B is rectilinear; in other words, the angle αB1 is constant along the portion B1.

The angle αB1 is defined between the part of the axis ZB1 arranged on the side of the distal end B11 of the distal portion B1 relative to the plane P2 on the one hand, and the part of the plane P2 arranged on the side of the distal end E42 relative to the axis ZB1 on the other hand.

The angle αB1 is equal to 30°. The angle αB1 is comprised between 20° and 60°. To ensure optimal operation of the connector 1, the angle αB1 is smaller than 40° and strictly smaller than the angle αA2. In fact, the difference between the angle αB1 and the angle αA2 is greater than the angles at the adhesion friction cone, considered, for one, at the contacts between the body 4 and the end piece 2 and, for the other, at the contacts between the body 4 and the ring 5. This difference is comprised between 15° and 60°, still more preferably equal to 45°. Contacts between the body 4 and the end piece 2 to the contacts between the locking pins D and the edges of the locking slots A. Contacts between the body 4 and the ring 5 refer to the contacts between the guiding pins C and the edges of the guiding slots B. The angle of the adhesion friction cone depends essentially on the pair of materials in contact and their surface states. For example, in the case of steel/steel contact, this angle is approximately 11°.

In the view developed in FIG. 8, ZB2 denotes the central geometric axis of the proximal portion B2 of the guiding slot B. αB2 denotes the angle protruding between the axis ZB2 and the plane P2. The portion B2 of the guiding slot B is rectilinear; in other words, the angle αB2 is constant along the portion B2.

The angle αB2 is defined between the portion of the axis ZB2 positioned on the side of the distal end B11 of the distal portion B1 relative to the plane P2 on the one hand, and the plane portion P2 arranged on the side of the distal end E42 relative to the axis ZB2 on the other hand.

The angle αB2 is equal to 60°. The angle αB2 is comprised between the value of the angle αB1 and 80°.

The end piece 2 and the coupling element 3 are brought closer together through translation of the coupling element 3 relative to the end piece 2, along the axis X-X'.

Figure 2:
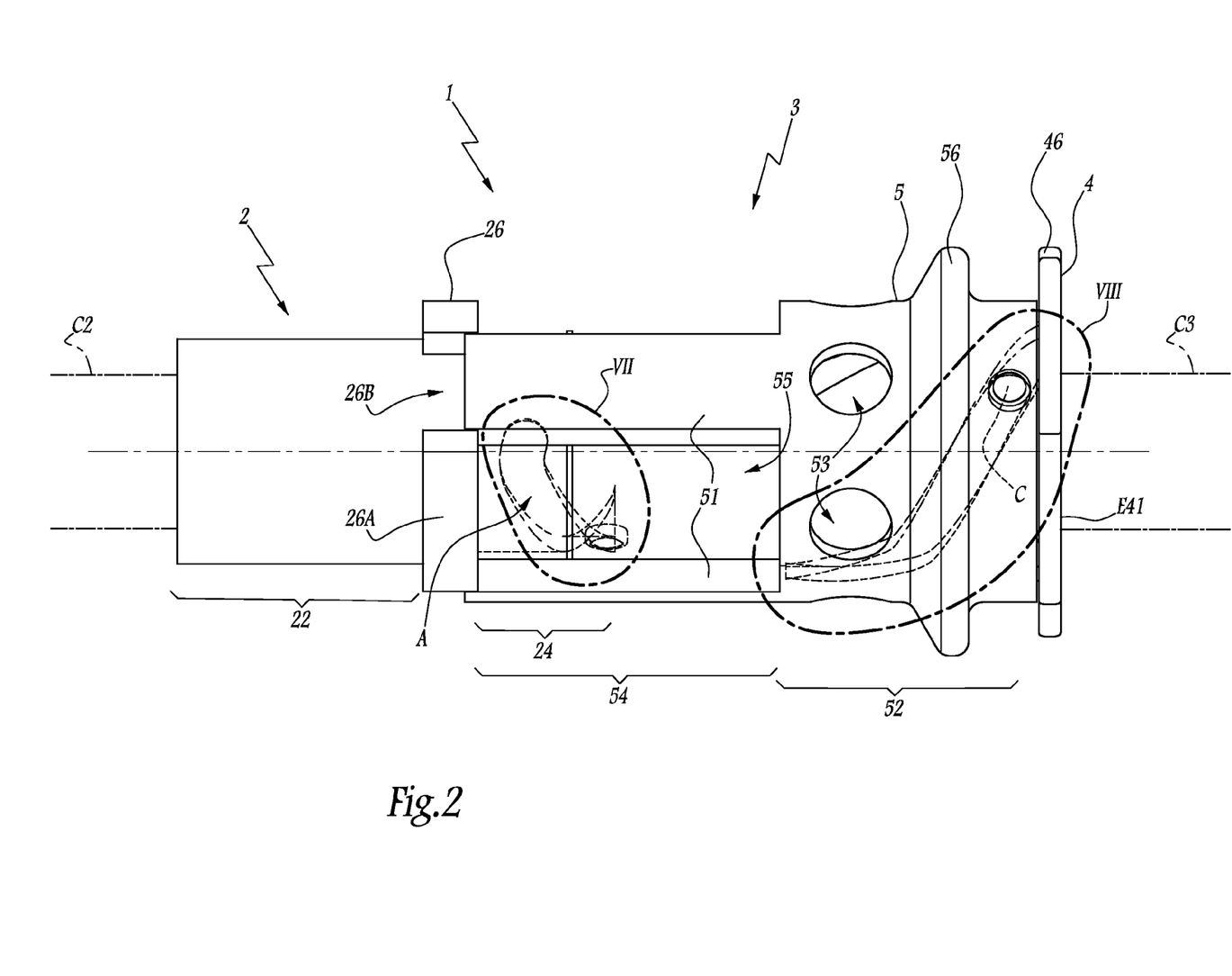
FIG. 2 is a side view of the connector of FIG. 1 in an initial connected configuration of a first element of the connector with a second element of the connector.

Before connection and up to an initial connected position shown in FIGS. 2 and 3, the coupling element 3 is in a retracted configuration. In this configuration, the ring 5 is maximally axially retracted relative to the body 4, opposite the distal end E42 of the body 4. The annular flange 52A of the ring 5 abuts against the shoulder 42A of the body 4.

At the beginning of connection of the connector 1, the distal end E22 of the end piece 2 is inserted into the opening 49, and the posts 51 of the rings 5 are inserted into the notches 26B of the flange 26 of the end piece 2. The notches 26B of the flange 26 cooperate with the posts 51, which blocks the rotation, around the axis X-X', of the ring 5 relative to the end piece 2. More specifically, the parallel longitudinal edges of the posts 51 slide against the longitudinal edges of the notches 26B, parallel to the axis X-X'. Owing to the rotational mobility of the body 4 relative to the channel C3, it is easy to correctly position the ring 5 angularly relative to the end piece 2. The relative angular position of the end piece 2 with respect to the coupling element 3 in the retracted configuration, defined by the cooperation of the notches 26B with the posts 51, allows the locking pin D of the body 4 to be engaged in the inlet A11 of the locking slot A of the end piece 2.

The ring 5 is then only translatably movable, along the axis X-X', relative to the end piece 2, since the ring 5 is rotatably connected around the axis X-X' with the end piece 2.

The operator acts indifferently on the body 4, by rotating it, or on the ring 5, by translating it toward the end piece 2, to combine the elements 2 and 3, since the ring 5 and the body 4 are connected following a combined relative rotational and translational movement.

The locking pin D progresses in the inlet portion A1 of the locking slot A. This link between the locking pin D and the locking slot A causes a combined rotational and translational movement of the body 4 relative to the end piece 2. However, on the one hand, the ring 5 and the body 4 are connected according to a combined relative rotational and translational movement, and, on the other hand, the ring 5 is blocked in rotation relative to the end piece 2. In this way, the body 4 and the ring 5 progress along the axis X-X', toward the end piece 2, simultaneously with the guiding pin C, which progresses in the proximal portion B2 of the guiding slot B, toward the distal end B11 of the guiding slot B and the posts 51, which remain engaged in the notches 26B.

Figure 4:
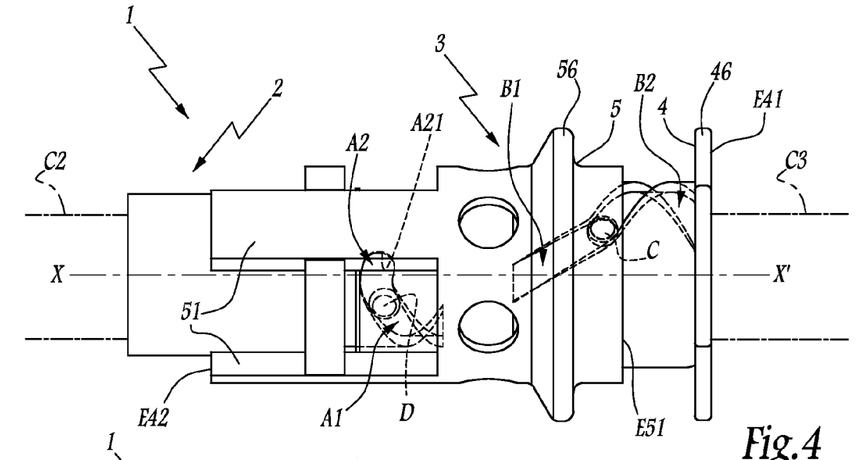
FIGS. 4, 5 and 6 are side views of the connector, in an intermediate connected configuration, in a connected configuration, and in an intermediate disconnected configuration, respectively.

FIG. 4 shows the connector 1 in an intermediate connected configuration, in which the guiding pin C is situated at the junction between the portions B1 and B2 of the guiding slot B. In this configuration of the connector 1, the locking pin D is at the proximal end of the inlet portion A1 of the locking slots A, just before the connection between the portions A1 and A2.

FIG. 5 shows the connector 1 in a connected configuration. The coupling element 3 is in a deployed configuration. The guiding pin C is arranged in the distal portion B1 of the guiding slot B, near the distal end B11 of the guiding slot B. The axial progression of the ring 5 toward the end piece 2 is blocked with the abutment of the locking pins D against the closed end A21 of the locking slot A.

Irrespective of the position of the ring 5 relative to the body 4, the guiding pins C are axially offset relative to the locking pins D, and the guiding pins C are closer to the proximal end E41 of the body 4 than the locking pins D.

In the intermediate connected configuration (FIG. 4), the body 4 has already reached its axial locking position relative to the end piece 2. In other words, the axial position of the body 4 relative to the end piece 2, along the axis X-X', is identical in the intermediate connected configuration (FIG. 4) and in the connected configuration (FIG. 5).

Between the intermediate connected configuration (FIG. 4) and the connected configuration (FIG. 5) of the connector 1, the posts 51 remain engaged with the notches 26B and the body 4 performs a combined rotational and translational movement relative to the end piece 2, with the guiding pin C progressing in the distal portion B1 of the guiding slot B. The translation of this combined movement is first done toward the end piece 2, then opposite the end piece 2. The body 4 thus performs an axial back-and-forth movement relative to the end piece 2 from its axial locking position, which it exceeds toward the end piece 2 to reach a maximum axial over-travel position, shown in FIG. 6, to then return to its axial locking position, in which the connector 1 is in the connected configuration and the locking pin D is engaged with the locking portion A2. This back-and-forth movement combined with the rotational movement of the body 4 relative to the end piece 2 is caused by the link between the locking pins D and the locking slots A. The retraction movement of the body 4 relative to the end piece 2 from its maximum over-travel position is caused by the engagement of the locking pin D in the locking portion A2 of the locking slot A: in the direction of progression of the locking pin D in the locking portion A2, during connection of the connector 1, the locking portion A2 is oriented toward the distal end E22 of the end piece 2.

As shown for the connector 101 of FIG. 9, the channel C3 of the connector 1 forms a coil, so as to allow the back-and-forth movement as well as a limited movement accompanying the end piece 2 by the body 4 in the event of tearing when the connector 1 is connected. The cable 6 is attached on the channel C3 upstream of the coil, i.e. on the side opposite the coupling element 3 relative to the coil. The cable 6 is substantially stretched when the connector 1 is in the connected configuration. Alternatively, the cable 6 does not form a coil, but is arranged according to another non-rectilinear form along the axis X-X', for example a zigzag. The cable 6 then comprises at least one portion not parallel to the axis X-X'. Likewise, the cable 6 is then attached on the channel on the side opposite the first element relative to a portion of the channel not parallel to the axis X-X'.

In the connected configuration, the valves 23 and 43 are pushed back outside their respective seats 21 and 41, and the fluid flows in the channel 30 and the longitudinal passage 20. Furthermore, as of the beginning of the connection, the resilient forces from the springs 25 and 45 oppose an axial approach between the end piece 2 and the body 4. This results in keeping the locking pin D in the locking portion A2 of the locking slot A, once the locking pin D cooperates with the locking portion A2 and the operator stops acting on the connector for the connection, and pressing the locking pin D against the closed end A21. Due to the orientation of the locking portion A2, from the proximal end of the inlet portion A1, toward the distal end E22 of the end piece 2, the cooperation between the locking pin D and the closed end A21 of the locking portion A2 blocks the relative movement of the end piece 2 with respect to the body 4 axially, i.e. following a separating movement parallel to the axis X-X', and circumferentially, i.e. opposes a relative rotational movement around the axis X-X', in the connected configuration of the connector 1.

The guiding pin C and the guiding slot B are not subjected to locking forces in the connected configuration of the connector 1.

To disconnect the end piece 2 outside the tip 3 under normal disconnection conditions, operator axially drives the ring 5 relative to the body 4 in a direction opposite the tip 2. This disconnecting force presses the guiding pin C against an edge of the distal portion B1 of the guiding slot B.

The distal portion B1 of the guiding slot B being inclined by an angle $\alpha B1$, the contact force between the guiding pin C and the distal portion B1 of the guiding slot B generates a circumferential unlocking force on the body 4 from the axial disconnecting force. Due to the orientation of the distal force B1 and the difference in angle between $\alpha B1$ and $\alpha A2$, this circumferential force causes the body 4 to rotate relative to the ring 5 and relative to the end piece 2, with the guiding pin C progressing toward the proximal end B21 in contact with the guiding slot B, and with the locking pin D progressing outside the locking portion A2 toward the inlet portion A1 of the locking slot A, with a forward movement of the body 4 toward its maximum over-travel position toward the end piece 2 (FIG. 6), then a backward movement of the body 4.

The connector reaches the intermediate disconnected configuration shown in FIG. 4, in which the locking pin D is positioned outside the locking portion A2 and the ring 5 has been moved axially from its position in the connected configuration of the connector toward the channel C3, opposite the end piece 2.

The tip 3 is then completely removed in a movement opposite the connecting movement. The guiding pin C progresses in contact with one of the longitudinal edges of the proximal portion B2 of the guiding slot B. This circumferential force generated and the forces from the springs 25 and 45 of the valves 23 and 43 drive the locking pin D outside the inlet position A1 of the locking slot A and outside the end piece 2. The connector 1 returns to the disconnected configuration and the tip 3 is again in the retracted configuration. The valves 21 and 41 are pushed back against their seat 23 or 43 and ensure sealing of the channels C2 and C3. The tip 3 is available for a new automatic connection.

Alternatively, to disconnect the end piece 2 outside the tip 3, if significant ice has formed between the elements of the connector 1, the operator acts on the actuating flange 46 and rotates the body 4 relative to the ring 5, in a direction tending to bring the tip 3 into the retracted configuration. The rotational movement initiated by the operator causes the unlocking of the end piece 2 relative to the body 4 and the exit of the locking pin D outside the locking portion A2 of the locking slot A, with the guiding pin C progressing in the guiding slot B, toward the proximal end B21.

When the connector 1 is in the connected position and the tip 3 and the end piece 2 are separated from each other, for example, if the vehicle to which the end piece 2 is connected moves away from the channel C3, the body 4 accompanies the movement of the end piece 2 due to the coiled geometry of the channel C3, while the ring 5 cannot be driven axially with the body 4, because the cable 6 retains it. The cable 6 creates a retaining force on the ring 5. The ring 5 moves along the axis X-X' relative to the body 4 from its position in the connected configuration of the connector 1 and toward its position in the disconnected configuration of the connector 1, opposite the end piece 2, and the guiding pin C of the ring 5 then comes into contact with an edge of the distal portion B1 of the guiding slot B.

To allow the automatic disconnection of the connector 1 in case of accidental tearing, an angle difference has been chosen between $\alpha B1$ and $\alpha A2$ that is larger than the angles of the adhesion friction cone. Thus, the axial retaining force of the ring 5, which separates the ring 5 from the end piece 2, applied at the contact between the guiding pin C and the distal portion B1, causes a circumferential force at the contact between the locking pin D and the locking portion A2 that rotates the body 4 relative to the tip 2, and therefore relative to the ring 5, and which causes the body 4 to advance toward the end piece 2, against the resilient forces from the valves 23 and

43. The locking pin D then progresses in the locking portion A2 from its locked position toward the inlet position A1 and in the inlet position A1 toward the inlet position A11 until the connector is disconnected. The angle αB1 of the portion B1 of the guiding slot B is smaller than 40°, which makes it possible to create a relatively significant circumferential force from the axial retaining force. If the angle αB1 is too large, for example greater than or equal to 45°, then the axial retaining force will need to be high to generate a sufficient circumferential force to break the ice that may form between the elements 2, 3 and 4 of the connector and which blocks the movements of the end piece 2 relative to the body 4. This ice does not remain jammed between the elements 2, 4 and 5 of the connector 1 owing to the openings 53, which allow it to be discharged toward the outside of the connector 1.

The rotation of the body 4 generated by the retaining force with the guiding pin C progressing in the distal portion B1 of the guiding slot B, brings the body 4 axially closer toward the end piece 2, which allows the locking pin D to leave the locking portion A2 of the locking slot A. The body 4 ceases to accompany the separating movement of the end piece 2. The connector 1 can disconnect in a movement opposite the connecting movement. The locking pin D leaves the locking slot A. The ring 5 is retracted relative to the body 4 until it abuts against the shoulder 42A of the body 4, i.e. in the retracted configuration of the tip 3. The valves 21 and 41 are pushed back against their seat 23 or 43 and ensure sealing of the channels C2 and C3.

Thus, from the connected configuration of the connector 1, moving the ring 5, opposite the end piece 2, causes the body 4 to move forward toward the end piece 2 toward its maximum over-travel position for the locking pin D to exit the locking portion A2.

The automatic movement of the ring 5 for disconnection in the event of accidental tearing is particularly suited for applications for which ice forms between the body 4 and the end piece 2. The actuation of the body 4 using the ring 5 in fact occurs at the contact between the guiding pin C and the distal portion B1 of the guiding slot B, away from the overlap between the end piece 2 and the body 4, particularly subject to ice, and with a demultiplied circumferential force. Furthermore, the connector 1 only comprises a single ring, which limits the contact interfaces where ice may be housed and provides good accessibility to discharge the ice toward the outside of the connector 1.

The automatic disconnection of the connector 1 makes it possible not to damage the elements 2, 4 and 5 of the connector in the event of accidental tearing, which secures the connector 1 and prevents the fluid from flowing into the atmosphere.

Alternatively, when the forces absorbed by the connector 1 are significant, the locking pins D and/or the guiding pins C are replaced by rollers.

Alternatively, the number of guiding slots A and guiding pins C is different from three. Likewise, the number of locking slots A and locking pins D may be different from three. In general, the guiding pins C have the same axial position. The same is true for the locking pins D.

In another embodiment of the invention, the number of guiding slots A and guiding pins C is different from the number of locking slots A and locking pins D.

In another embodiment of the invention, the pins C and D and the slots A and B are not regularly angularly distributed over the circumference of the connector 1.

Alternatively, the portions A1, A2, B1 and B2 of the slots A and B are not rectilinear. In that case, the slots A and B are curved in developed view. The angles αA1, αA2 are then measured between the plane P1 and the tangent at the points of contact between the locking pins D and the locking slots A and the angles αB1 and αB2 are then measured between the plane P2 and the tangent at the points of contact between the guiding pins C and the guiding slots B, the tangent constituting the axis ZA1, ZA2, ZB1 and ZB2 used to define the angles αA1, αA2, αB1 and αB2.

Alternatively, a resilient return member, not shown, is inserted axially between the body 4 and ring 5, for example between the annular flange 44A and the annular flange 52A, and pushes the ring 5 back toward its position in the retracted configuration of the coupling element 3. This resilient force is much lower than the repulsion force generated by the springs 25 and 45 of the valves 23 and 43 between the body 4 and the end piece 2 in the connected configuration of the connector 1, and does not compromise the stability of the connected configuration of the connector 1.

Alternatively, the guiding pins C are supported by the body 4 and guiding slots B are formed on the ring 5.

In another alternative, the locking pins D are supported by the end piece 2 and the locking slots B are borne by the body 4.

The end piece 2 has been described as a male element and the coupling element 3 as a female element. However, depending on the arrangement of the locking pins D and the locking slots A on the two connecting elements, the coupling element may be configured as a male element and the end piece as a female element.

FIG. 9 shows a connector 101 according to a second embodiment of the invention, comprising an end piece 102 and a coupling element 103. In the second embodiment, the elements similar to those of the first embodiment bear the same numerical references, increased by 100. The elements of the connector 101 that are passed through by the fluid are radially distant from the elements of the connector 101 that ensure locking of the end piece 102 in the coupling element 103.

Hereafter, we will not describe the elements of the connector 101 that are similar to those of the connector 1 in detail.

The connector 101 comprises an end piece 102 and a coupling element 103. The coupling element 103 comprises a body 104 and a ring 105.

The end piece 102 comprises a main body 102A, provided with locking slots A, and an inner body 102B that is mounted inside the main body 102A coaxially and that is connected to a channel C102. The inner body 102B is fastened on an inner portion 128 of the main body 102A and delimits a longitudinal passage 120. The inner body 102B forms a seat 121 of a valve 123 of the end piece 102. An annular space E102 is radially provided between the main body 102A and the inner body 102B, in particular at the axial level of the locking portions A2 of the locking slots A.

The body 104 comprises a main body 104A, provided with guiding slots B, and an inner body 104B mounted inside the main body 104A coaxially. The inner body 104B is connected to a channel C103. The inner body 104B is fastened on an inner portion 148 of the main body 104A. The inner body 104B forms the seat 141 of the valve 143 of the coupling element 103 and delimits a channel 130. The main body 104A is provided with locking pins D that cooperate with the locking slots A of the main body 102A of the end piece 102. An annular space E104 is provided radially between the main body 104A and the inner body 104B, in particular at the axial level of the locking pins D.

The ring 105 is provided with guiding pins C, not shown in FIG. 9, which cooperate with the guiding slots B of the body 104.

The connecting and disconnecting mechanism for the connector 101 is similar to that of the connector 1, with the cooperation of the pins C and D with the slots A and B.

When the connector 101 is in the connected configuration and a liquid is flowing between the channels C102 and C103, the liquid circulates in the inner bodies 102B and 104B and the annular spaces E102 and E104 provide thermal insulation between the main body 104A of the body 104 and the fluid, as well as between the main body 102A of the end piece 102 and the fluid.

Less ice therefore tends to form between the elements of the connector 101, since the inner bodies 102B and 104B are radially separated from the main bodies 102A and 104A, in particular near the locking contacts. The unlocking forces to be exerted will therefore be decreased relative to those required for the connector of FIGS. 1 to 8.

Figure 10:
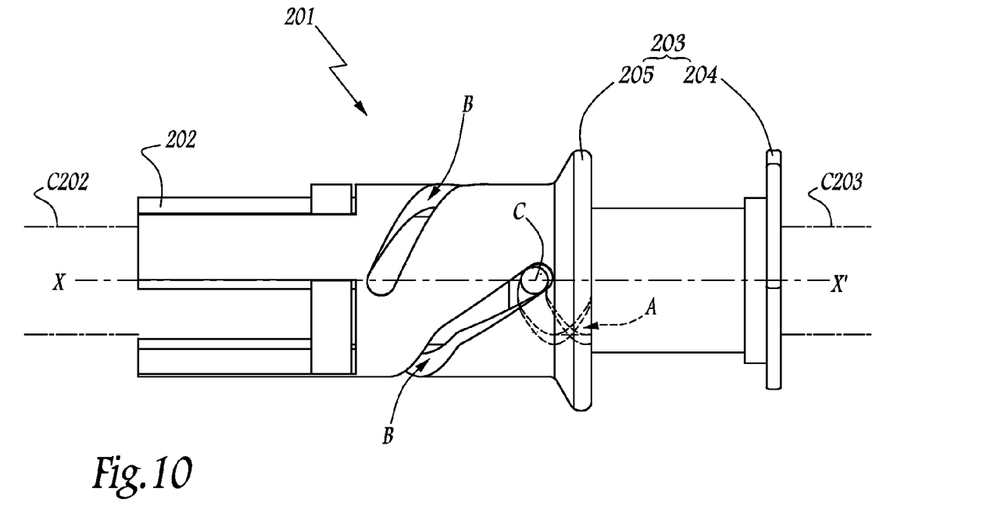
FIG. 10 is a side view of a connector according to a third embodiment of the invention, in the connected configuration.
Figure 11:
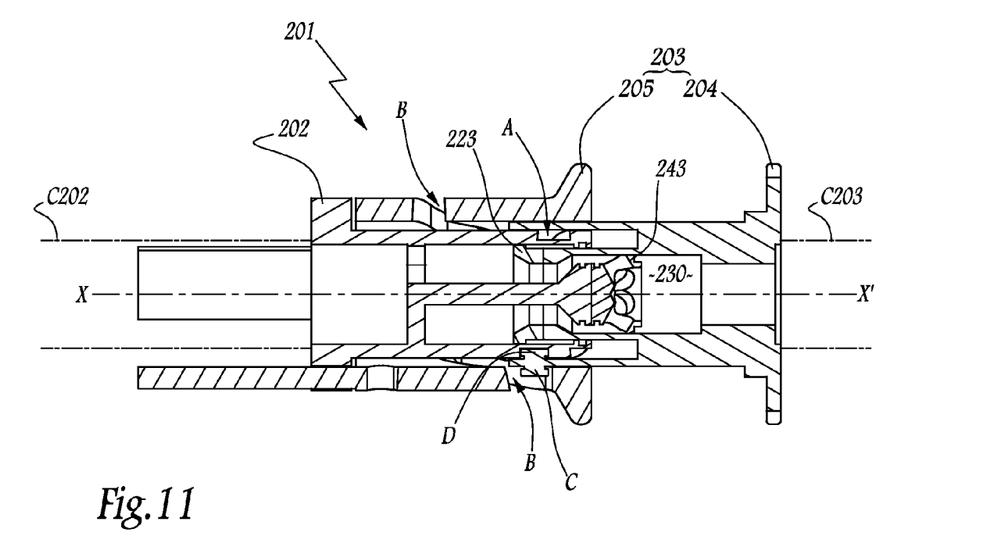
FIG. 11 is an axial cross-section of the connector of FIG. 10.

FIGS. 10 and 11 show a connector 201 according to a third embodiment of the invention, which comprises an end piece 202 and a coupling element 203, respectively connected to channels C202 and C203. In the third embodiment, the elements that are similar to those of the first embodiment bear the same numerical references, increased by 200.

Hereafter, we will not describe the elements of the connector 201 that are similar to those of the connector 1 in detail.

The coupling element 203 has a channel 230 and comprises a body 204 and a ring 205. The body 204 bears both the inner locking pins D and the outer guiding pins C. Each guiding pin C is radially aligned with a locking pin D. The guiding pins C cooperate with inner guiding slots B of the ring 205 and the locking pins D cooperate with outer locking slots A of the end piece 202.

The end piece 202 houses a valve 223 pushed back by default against its seat in the sealed position using a spring (not shown). Likewise, the body 204 houses a valve 243 pushed back by default against its seat in the sealing position using a spring (not shown).

The coupling element 3 is designed so that in the retracted configuration of the coupling element 3 and in the disconnected configuration of the connector 1, with the ring 5 abutting against the body 4 of the coupling element 3, the end piece 2 can be inserted into the coupling element 3. In this way, the retracted position of the coupling element 3 simultaneously allows the insertion of the posts 51 into the notches 26B and the insertion of the locking pins D into the inlet portions A11 of the locking slots A. The angular position of the body 4 relative to the ring 5, in the retracted configuration of the coupling element 3, is defined by the connection between the guiding pins C and the proximal portions B2 of the guiding slots B. To that end, the proximal portions B2 do not have a wholly circumferential direction and have a non-zero axial component. Alternatively, the guiding slot has more than two portions with different inclines with at least one distal portion oriented as described for the distal portion B1 and a proximal portion oriented as described for the proximal portion B2.

Alternatively, the coiled arrangement of the channel attached to the coupling element may be replaced by any other non-rectilinear arrangement of part of the channel relative to the axis X-X', allowing the possibility of axial spacing between the coupling element body and the channel in its portion opposite the coupling element relative to the non-rectilinear part of the channel.

Alternatively, only one of the two connecting elements houses a valve ensuring sealing of the channel connected to the connecting element in the disconnected configuration of the connector, the resilient force exerted on said valve opposing the approach between the two elements of the connector in the connected configuration, thereby guaranteeing the stability of the connected configuration.

In all of the embodiments, the geometry of the guiding slots is adapted to the geometry of the locking slots so as to allow the body of the first element to move in its first combined translational and rotational movement relative to the second element and to move in its combined translational and rotational movement relative to the ring, whereas the ring and the second element are rotatably linked.

In the context of the invention, the various embodiments and alternatives of the invention may be combined with each other, at least partially.

The invention claimed is:

1. A connector for removably connecting two fluid channels, the connector extending longitudinally along a longitudinal axis and comprising a first element and a second element that can fit into one another, the first element comprising a body delimiting a fluid passage channel that extends axially, at least one of the first element and the second element being equipped with a valve and a resilient member for returning the valve to the sealing position, each valve ensuring fluid sealing of the element when the connector is in the disconnected configuration and allowing the fluid to flow in the channel when the connector is in the connected configuration, the second element and the body being connected, when the second element and the first element are at least partially fitted in one another, following a combined rotational and translational relative movement, along the axis, by a first connection between at least one locking pin and at least one locking slot that includes an inlet portion and a locking portion, the body adopting, in the connected configuration of the connector, an axial locking position relative to the second element, the first connection being, on the one hand, such that the body moves past its axial locking position relative to the second element to engage the locking pin in the locking portion of the locking slot during the connection and, on the other hand, able to lock the second element axially relative to the body of the first element when the connector is in the connected configuration and the locking pin cooperates with the locking portion, the resilient return member of each valve then opposing the axial approach between the second element and the body, wherein the first element includes a single ring mounted around the body, the body and the ring being connected in a combined relative rotational and translational movement along the axis by a second connection between at least one guiding pin and at least one guiding slot, wherein, when the second element and the first element are at least partially fitted into one another, the second element and the ring are translatable and rotationally connected relative to one another along the axis, wherein, in the connected configuration of the connector, the guiding pin is arranged in the guiding slot, wherein, when the connector is in the connected configuration and the ring is moved relative to the body along the axis, opposite the second element, the connector adopts an intermediate connected configuration, in which the locking pin is positioned outside the locking portion of the locking slot.

2. The connector according to claim 1, wherein a first angle between a geometric axis of a first portion of the guiding slot, in which the guiding pin is positioned in the connected position of the connector, on the one hand, and a first plane that passes through the axis, which extends in a radial direction relative to the axis and which intersects the first portion of the guiding slot, on the other hand, is smaller by at least 15° than a second angle between a geometric axis of the locking portion of the locking slot on the one hand, and a second plane that passes through the axis, extends in a radial direction relative to the axis, and intersects the locking portion of the locking slot, on the other hand.

3. The connector according to claim 2, wherein the first angle is between 20° and 40°.

4. The connector according to claim 1, wherein when the connector is in the disconnected configuration and the first element is in a retracted configuration, in which the ring is axially retracted relative to the body, opposite the distal end of the body, the guiding pin is positioned in the guiding slot.

5. The connector according to claim 2, wherein when the connector is in the disconnected configuration and the first element is in a retracted configuration, in which the ring is axially retracted relative to the body, opposite the distal end of the body, the guiding pin is positioned in the guiding slot and wherein each guiding slot also includes a second portion inclined relative to the axis with which the guiding pin cooperates in the detached configuration of the connector and wherein a third angle between a geometric axis of the second portion of the guiding slot on the one hand, and the first plane on the other hand, is between the value of the first angle and 80°.

6. The connector according to claim 2, wherein when the guiding pin cooperates with the first portion of the guiding slot, the body reaches or exceeds its axial locking position relative to the second element.

7. The connector according to claim 1, wherein the locking pin is formed on an inner radial surface of a distal part of the body of the first element.

8. The connector according to claim 1, wherein the guiding pin is formed on an inner radial surface of a proximal part of the ring.

9. The connector according to claim 1, wherein the body bears both the guiding pins and the locking pins.

10. The connector according to claim 1, wherein the body includes a stop that limits the axial movement of the ring opposite a distal end of the body.

11. The connector according to claim 10, wherein a resilient return member is axially inserted between the body of the first element and the ring and wherein the resilient element can push the ring back against the stop.

12. The connector according to claim 1, wherein the body includes a stop that limits the axial movement of the ring toward a distal end of the body.

13. The connector according to claim 1, wherein the ring is provided with posts, wherein the second element is provided with notches, wherein when the first element and the second element are at least partially fitted into one another, the notches cooperate with the posts, which blocks the rotation around the axis of the second element relative to the ring.

14. The connector according to claim 1, wherein the ring is provided with holes that put an outer surface of the body in communication with the outside of the connector.

15. The connector according to claim 1, wherein the body of the first element is made up of an inner body defining a channel for the fluid and a main body that are coaxial and integral, and wherein the second element is made up of an inner body defining a passage for the fluid and a main body that are coaxial and integral, the connection between the locking pin and the locking slot being made at the main bodies, the inner bodies and the main bodies of the first and second elements being separated by an annular space.

16. The connector according to claim 1, wherein at least one cable connects the ring to the channel of the first element, wherein at least part of the cable of the first element is not parallel to the longitudinal axis and wherein the cable is fastened on the channel on the side opposite the first element relative to a part of the channel not parallel to the longitudinal axis.

17. The connector according to claim 2, wherein the first angle is 45° smaller than the second angle.

18. The connector according to claim 5, wherein the third angle is equal to 60°.

* * * * *